UNITED STATES PATENT OFFICE.

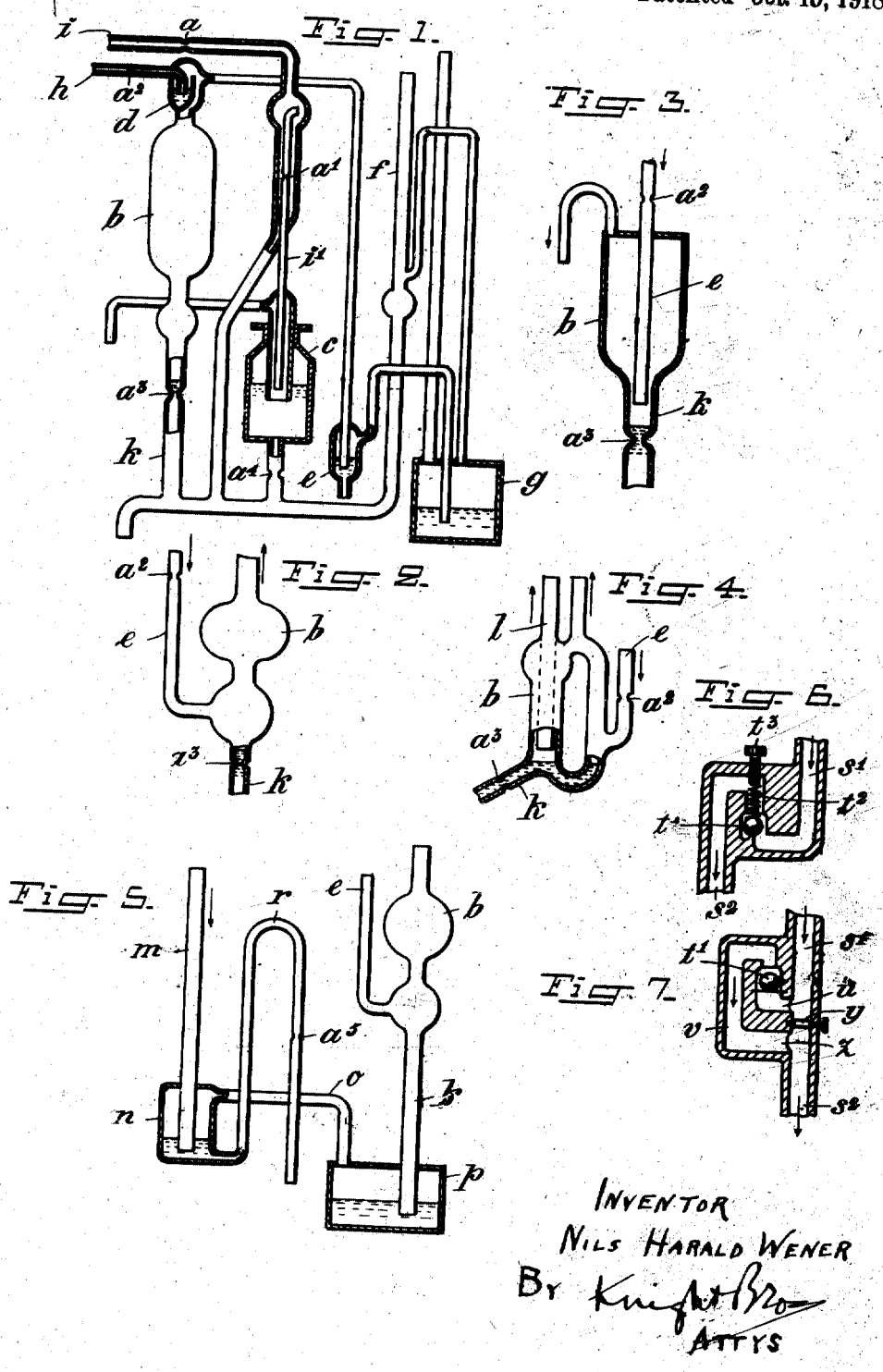

NILS HARALD WENER, OF STOCKHOLM, SWEDEN, ASSIGNOR TO SVENSKA AKTIE-BOLAGET MONO, OF STOCKHOLM, SWEDEN.

GAS-ANALYZING APPARATUS.

1,281,729.  Specification of Letters Patent.  Patented Oct. 15, 1918.

Application filed August 2, 1918. Serial No. 248,051.

*To all whom it may concern:*

Be it known that I, NILS HARALD WENER, civil engineer, subject of the King of Sweden, residing at 11 Uppsalagatan, Stockholm, Sweden, have invented certain new and useful Improvements in Gas-Analyzing Apparatus, of which the following is a specification.

The present invention refers to gas analyzing apparatus, in which the gas or its constituents are chemically or mechanically changed or in which one or more constituents are separated from a gas mixture or the temperature or the percentage of humidity are to be changed, or to gas analyzing apparatus serving any other similar purpose and consists in the speed of the gas flow or liquid flow in one direction being reduced, while the flow in the opposite direction remains unaffected. This is attained by inserting a device in a part of the piping suitable for the purpose, said device forming a resistance to the gas flow in one of the two directions of flow. By this means the time necessary for changing the composition of the gas or its constituents is gained. Preferably the device is arranged in such a place that the gas will reach the primary measuring vessel after having passed said device.

Some embodiments of known gas analyzing apparatus to which the invention is applied are shown in Figures 1–5, where the device is schematically represented as a contraction in the piping. Figs. 6–7 show two embodiments of the device in a larger scale.

In the apparatus according to Fig. 1, $b$ indicates the primary measuring vessel in which the liquid rises and falls through the medium of the vessel $c$ which forms a part of a pumping device, for instance according to the German Patent No. 2226,542. $d$ and $e$ indicate liquid seals, $f$ an ascending pipe, $g$ an absorption receptacle and $h$ a supply pipe for the gas to be analyzed. The pipes $i$ and $i^1$ are conduits for the pressure fluid operating the pump. Through the pipe $k$ the liquid enters the measuring vessel $b$.

According to the invention a device of the kind in question is arranged either in the exhaust pipe $i$ for the working fluid, thus at about the point $a$, or in the exhaust pipe $i^1$ (which in some embodiments of the apparatus opens directly into the ascending pipe $f$) as at $a^1$, or in the supply pipe $h$ for the gas, i. e. at $a^2$, or in the supply pipe for the liquid $k$, at $a^3$, or at least in the ascending pipe of the vessel $c$, i. e. at $a^4$. These devices are as stated above constructed in such a way that the speed of flow of the gas or the liquid is reduced only in one of the two directions. In the other direction on the other hand there is no resistance to the flow and the speed of flow is not changed.

This is attained by constructing the device according to the two embodiments shown in Figs. 6 and 7.

In Fig. 6 $s^1$ indicates the supply pipe for the gas or the liquid respectively, $t^1$ a ball valve adjustable by means of the spring $t^2$ and the set screw $t^3$, and $s^2$ the exhaust pipe for the gas or the liquid respectively. The speed of the flow in direction of the arrow will then be arbitrarily retarded by the ball valve according to the tension of the spring, while the speed of flow in the opposite direction is not influenced by the ball valve.

According to Fig. 7 $s^1$ again is the supply pipe which at $u$ is provided with a branch $v$, in which the ball valve $t^1$ is arranged in such a way, that the flow in one direction—opposite to the direction of the arrow in the branch—will be unaffected. At $z$ the branch again opens into the supply pipe. Between the exhaust and inlet openings $u$ and $z$, there is an adjustable flap valve $y$, arranged in the supply pipe. As a consequence, the speed of the flow in a direction opposite to that of the arrow will not be influenced, as the gas or the liquid can pass freely through the ball valve and thus through the branch $v$. At the flow in the direction of the arrow, however, the ball valve will close and the speed of flow therefore will be determined by the adjustment of the flap valve $y$. If the flap valve $y$ is fully open, the ball valve $t^1$ will not be operated. If, on the other hand, the flap valve is entirely closed, the retarding effect of the same is the greatest, as in this case the whole quantitiy of the gas or the liquid respectively must flow through $v$.

Fig. 2 shows an apparatus of another kind than one of Fig. 1, wherein the pipe $e$ directly opens into the measuring vessel $b$. The device which is shown here only schematically, may in accordance with Fig. 1 be arranged in the pipe $e$ at $a^2$ or in the pipe $k$ at $a^3$.

In the arrangement according to Fig. 3 the pipe $e$ opens into the measuring vessel $b$. The device may, as in Fig. 2, be arranged at $a^2$.

In the arrangement according to Fig. 4 the gas exhaust pipe 1 opens into the measuring vessel $b$ which consists of two communicating vessels. As in Fig. 2 or 3, the device may be arranged at $a^2$ or $a^3$ in the pipe $e$ or $k$.

According to Fig. 5 the measuring vessel $b$ is connected with the vessel $p$ through the pipe $k$. Water or another working fluid enters through the pipe $m$, whereby an increase of pressure takes place in the vessel $n$. This is transmitted to the vessel $p$ and effects a rise of the liquid in the pipe $r$. At the same time the liquid also rises in $k$ and $b$. As soon as the pipe $r$ is filled, an action takes place in it whereby the over pressure in $o$ and $p$ ceases. The liquid thus falls in $k$ and $b$. In this arrangement, the device may be arranged in the pipe $r$, for instance at $a^5$, whereby it is attained that the over pressure in $p$ as well as the liquid in $k$ will fall comparatively slowly so that the gas will be sucked in through $e$ only slowly.

In the arrangements shown, the device indicated as a contraction is always supposed to be stationary.

In certain cases, however, it may be advantageous to make the device detachable or to insert it by means of a branch pipe or in any other manner. Such an arrangement is particularly advantageous in cases when one and the same apparatus is to be used for different purposes and sometimes with, sometimes without the device. Several devices may also be used in the same pipe or in different pipes at the same time.

I claim:

An arrangement in gas analyzing apparatus, in which the gas is subjected to a mechanical or chemical change before or after absorption and in which the flow of gas through the piping is effected by means of a rising and falling liquid, characterized in that an obstruction, adjustable by hand, is arranged in the piping, said resistance having such a construction, that the speed of flow of the gas, or the liquid respectively, is reduced in one direction but is unaffected in the other direction.

In testimony whereof I affix my signature in presence of two witnesses.

NILS HARALD WENER.

Witnesses:
JACOB BAGGI,
FRITZ E. HALLIN.